US012771187B2

(12) United States Patent
Yamamoto et al.

(10) Patent No.: US 12,771,187 B2
(45) Date of Patent: Oct. 20, 2026

(54) MAGNETIC CORE, WINDING WITH MAGNETIC CORE, ROTARY ELECTRIC MACHINE, AND BRUSHLESS MOTOR

(71) Applicant: Murata Manufacturing Co., Ltd., Nagaokakyo (JP)

(72) Inventors: Ryosuke Yamamoto, Nagaokakyo (JP); Mitsuhiro Saito, Nagaokakyo (JP); Hisato Amano, Nagaokakyo (JP); Takuya Nansaka, Nagaokakyo (JP); Mitsutoshi Natsumeda, Nagaokakyo (JP); Kazuyoshi Ishizuka, Nagaokakyo (JP); Daiki Kishimoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 292 days.

(21) Appl. No.: 18/437,812

(22) Filed: Feb. 9, 2024

(65) Prior Publication Data

US 2024/0186844 A1 Jun. 6, 2024

Related U.S. Application Data

(63) Continuation of application No. PCT/JP2022/042604, filed on Nov. 16, 2022.

(30) Foreign Application Priority Data

Mar. 30, 2022 (JP) ................................ 2022-055644

(51) Int. Cl.
*H02K 1/16* (2006.01)

(52) U.S. Cl.
CPC .................................... *H02K 1/165* (2013.01)

(58) Field of Classification Search
CPC .......... H02K 1/146; H02K 1/165; H02K 3/00; H02K 3/42; H02K 3/46; H02K 3/34;
(Continued)

(56) References Cited

U.S. PATENT DOCUMENTS

2011/0258840 A1* 10/2011 Urano .................... H02K 1/148 29/596
2018/0248419 A1* 8/2018 Nigo ........................ H02K 1/02

FOREIGN PATENT DOCUMENTS

JP H11332138 A 11/1999
JP 2004343903 A 12/2004
(Continued)

OTHER PUBLICATIONS

JP-2008278632-A, all pages (Year: 2008).*
(Continued)

*Primary Examiner* — Naishadh N Desai
(74) *Attorney, Agent, or Firm* — ArentFox Schiff LLP

(57) ABSTRACT

A magnetic core that includes: a back yoke portion having a first lower surface aligned in an up-down direction; a tooth distal end portion having a second upper surface and a second lower surface aligned in the up-down direction; and extending in the up-down direction and having an upper end in contact with the first lower surface and a lower end in contact with the second upper surface, the tooth portion constructed to have a winding portion of a conductor wound around the tooth portion as viewed in the up-down direction, wherein the magnetic core has at least one structure of: (A) one or more first protrusions protruding from the first lower surface, and (B) one or more second protrusions protruding from the second upper surface.

19 Claims, 18 Drawing Sheets

(58) Field of Classification Search
CPC .. H02K 1/00; H02K 1/06; H02K 1/12; H02K 1/16; H02K 1/148
See application file for complete search history.

(56) References Cited

FOREIGN PATENT DOCUMENTS

| | | | | | |
|---|---|---|---|---|---|
| JP | 2008278632 | A | * | 11/2008 | |
| JP | 2014207755 | A | | 10/2014 | |
| WO | WO-2007029886 | A1 | * | 3/2007 | ............ H02K 3/522 |
| WO | 2017077590 | A1 | | 5/2017 | |

OTHER PUBLICATIONS

WO-2007029886-A1, all pages (Year: 2007).*
International Search Report in PCT/2022/042604, mailed Feb. 7, 2023, 3 pages.

* cited by examiner

MAGNETIC CORE, WINDING WITH MAGNETIC CORE, ROTARY ELECTRIC MACHINE, AND BRUSHLESS MOTOR

CROSS REFERENCE TO RELATED APPLICATIONS

The present application is a continuation of International application No. PCT/JP2022/042604, filed Nov. 16, 2022, which claims priority to Japanese Patent Application No. 2022-055644, filed Mar. 30, 2022, the entire contents of each of which are incorporated herein by reference.

TECHNICAL FIELD

The present invention relates to a magnetic core used in a rotary electric machine, a winding with a magnetic core including the magnetic core, a rotary electric machine including the magnetic core, and a brushless motor including the magnetic core.

BACKGROUND ART

As an invention related to a conventional magnetic core, for example, a rotary linear synchronous motor described in Patent Document 1 is known. The rotary linear synchronous motor includes divided iron cores. A tooth portion of the divided iron core is provided with a winding. A stator is formed by arranging a plurality of divided iron cores.

Patent Document 1: Japanese Patent Application Laid-Open No. 2004-343903

SUMMARY OF THE INVENTION

By the way, in the divided iron core described in Patent Document 1, there is a demand for improving electrical insulation between the iron core and the winding.

Therefore, an object of the present invention is to provide a magnetic core, a winding with a magnetic core, a rotary electric machine, and a brushless motor capable of improving electrical insulation between an iron core and a winding.

A magnetic core according to an embodiment of the present invention includes: a back yoke portion having a first upper surface and a first lower surface aligned in an up-down direction; a tooth distal end portion having a second upper surface and a second lower surface aligned in the up-down direction; and a tooth portion extending in the up-down direction and having an upper end in contact with the first lower surface and a lower end in contact with the second upper surface, the tooth portion constructed to have a winding portion of a conductor wound around the tooth portion as viewed in the up-down direction, wherein an outer edge of the back yoke portion viewed in the up-down direction surrounds an outer edge of the tooth distal end portion viewed in the up-down direction, an outer edge of the tooth distal end portion viewed in the up-down direction surrounds an outer edge of the tooth portion viewed in the up-down direction, and the magnetic core has at least one structure of (A) one or more first protrusions protruding from the first lower surface, and (B) one or more second protrusions protruding from the second upper surface.

In the present specification, the directions are defined as follows. In the magnetic core 1, a direction in which the tooth portion 4 extends is defined as an up-down direction. Further, a direction in which the short side of the first upper surface US1 extends is defined as a left-right direction. Further, a direction in which the long side of the first upper surface US1 extends is defined as a front-rear direction. The up-down direction, the left-right direction, and the front-rear direction are orthogonal to each other. In a brushless motor 100, a direction in which the shaft 23 extends is defined as a Z-axis direction. One side of the Z axis direction is defined as a Z+ direction. The other side of the Z axis direction is defined as a Z− direction. Note that the definition of the directions in the present specification is an example. Therefore, the directions of the magnetic core 1 at the time of actual use do not need to coincide with the directions in the present specification. In addition, the up-down direction may be reversed in FIGS. 1 to 11 and FIGS. 15 to 21. The left-right direction may be reversed in FIGS. 1 to 11 and FIGS. 15 to 21. The front-rear direction may be reversed in FIGS. 1 to 11 and FIGS. 15 to 21. In addition, the Z-axis direction may be reversed in FIGS. 12 to 14.

Hereinafter, X and Y are components or members of the brushless motor 100. In the present specification, each part of X is defined as follows unless otherwise specified. An upper part of X means the upper half of X. An upper end of X means the end of X in the upward direction. An upper end portion of X means the upper end of X and the vicinity thereof. This definition also applies to directions other than the upward direction.

In addition, "X is located on Y." means that X is located directly above Y. Therefore, X overlaps Y as viewed in the up-down direction. "X is located above Y." means that X is located directly above Y and that X is located diagonally above Y. Therefore, X may or may not overlap Y as viewed in the up-down direction. This definition also applies to directions other than the upward direction.

In the present specification, "X and Y are electrically connected" means that electricity is conducted between X and Y. Therefore, X and Y may be in contact with each other, or X and Y may not be in contact with each other. When X and Y are not in contact with each other, Z having conductivity is disposed between X and Y.

According to the magnetic core of the present invention, electrical insulation between the iron core and the winding can be improved.

DETAILED DESCRIPTION OF THE INVENTION

First Embodiment (Configuration of Magnetic Core 1)

Figure 1:
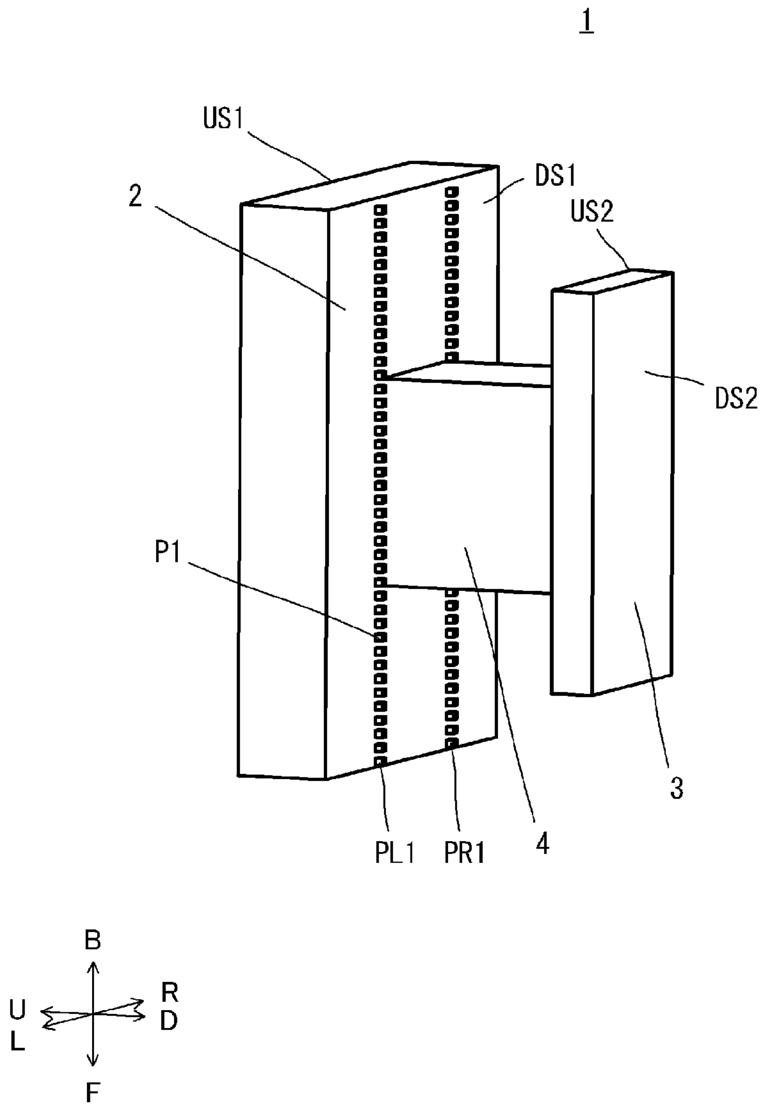
FIG. 1 is a perspective view of a magnetic core 1 according to a first embodiment.
Figure 2:
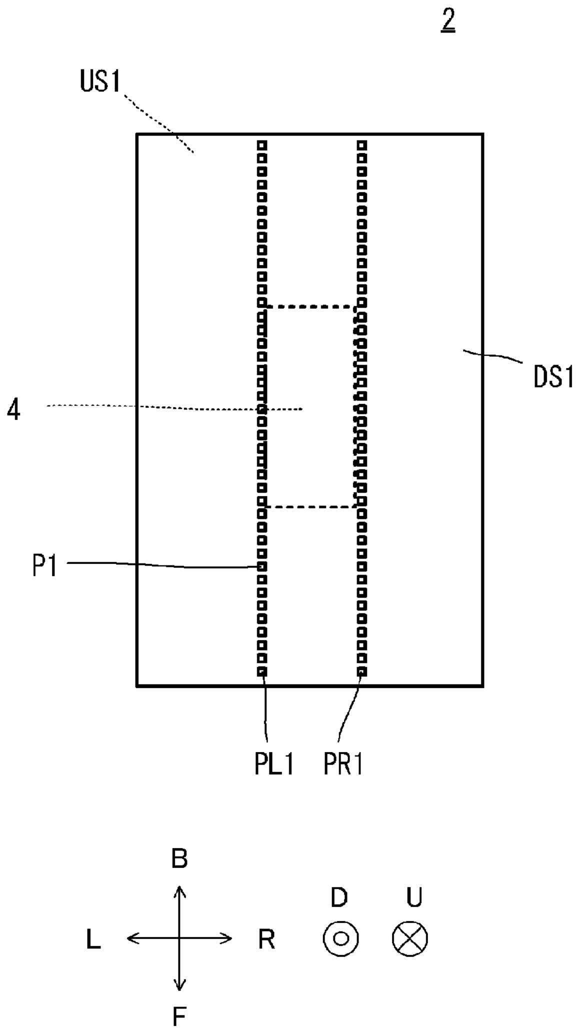
FIG. 2 is a plan view of a back yoke portion 2 according to the first embodiment as viewed in an upward direction.
Figure 3:
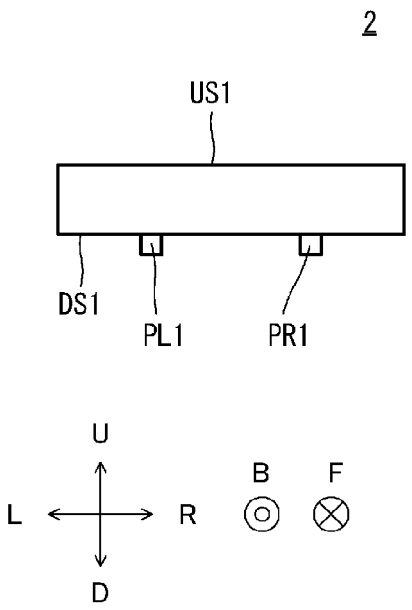
FIG. 3 is a plan view of the back yoke portion 2 according to the first embodiment as viewed in the front direction.
Figure 4:
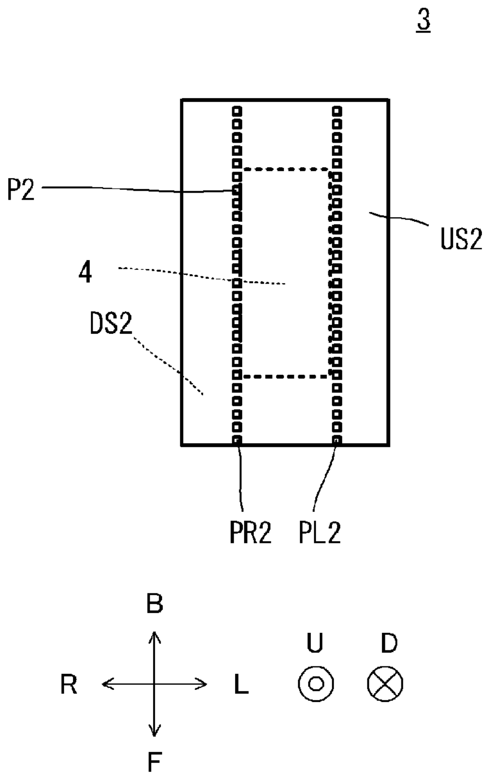
FIG. 4 is a plan view of a tooth distal end portion 3 according to the first embodiment as viewed in the downward direction.
Figure 5:
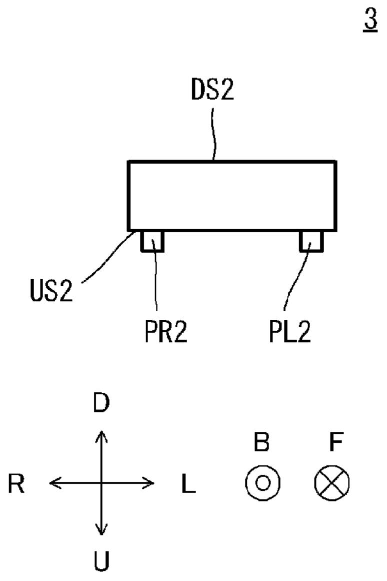
FIG. 5 is a plan view of the tooth distal end portion 3 according to the first embodiment as viewed in the front direction.
Figure 6:
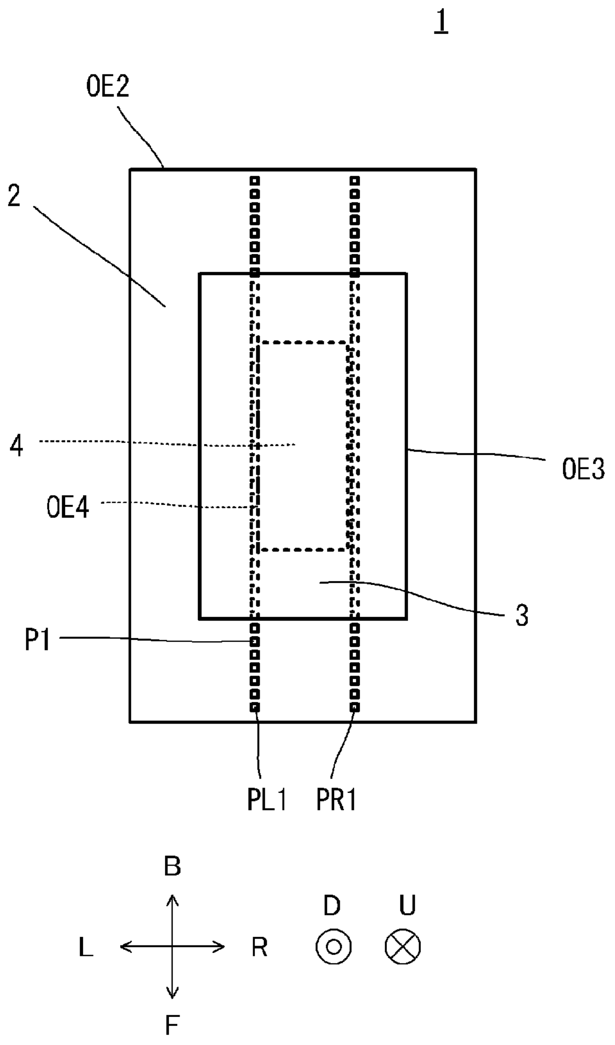
FIG. 6 is a plan view of the magnetic core 1 according to the first embodiment as viewed in the upward direction.
Figure 7:
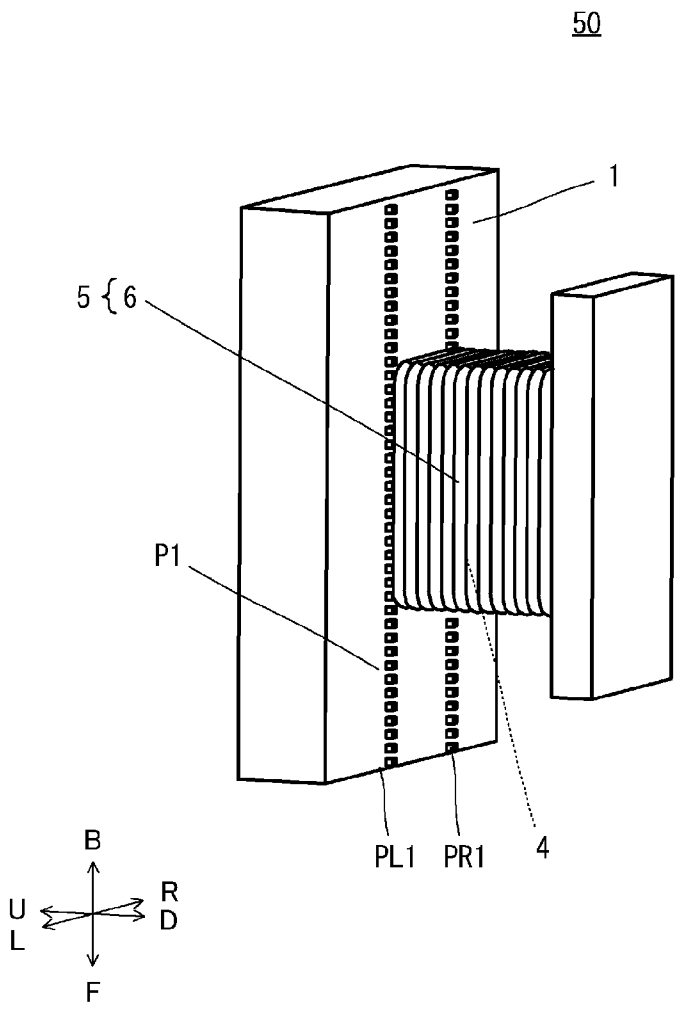
FIG. 7 is a perspective view of the magnetic core 1 and a conductor 5 according to the first embodiment.
Figure 8:
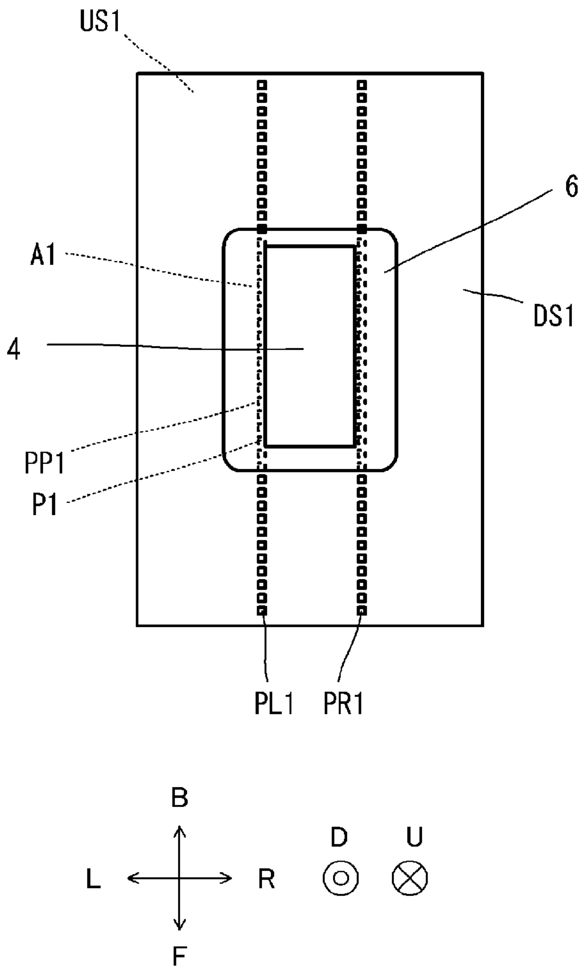
FIG. 8 is a plan view of the back yoke portion 2 and a winding portion 6 according to the first embodiment as viewed in the upward direction.
Figure 9:
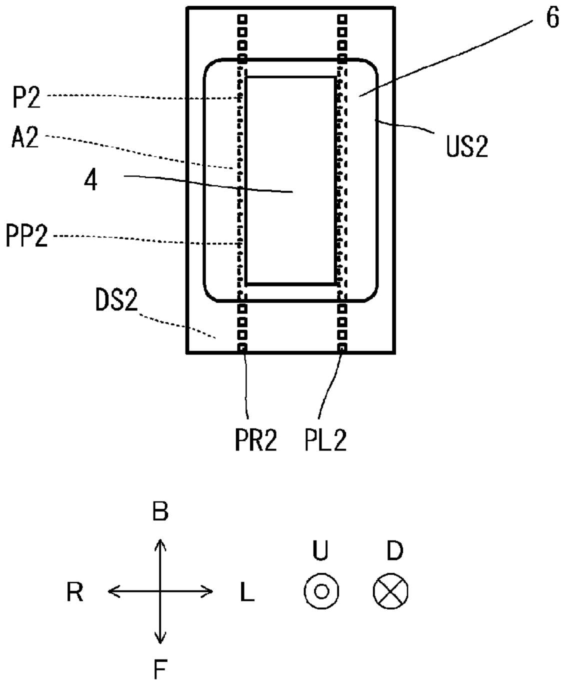
FIG. 9 is a plan view of the tooth distal end portion 3 and the winding portion 6 according to the first embodiment as viewed in the downward direction.
Figure 10:
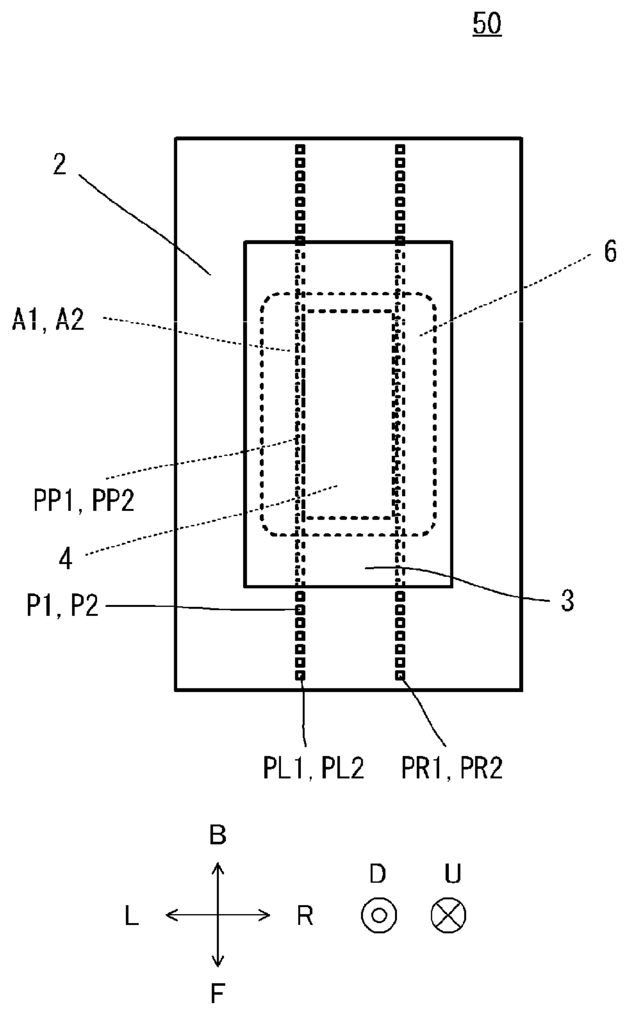
FIG. 10 is a plan view of the magnetic core 1 and the winding portion 6 according to the first embodiment as viewed in the upward direction.
Figure 11:
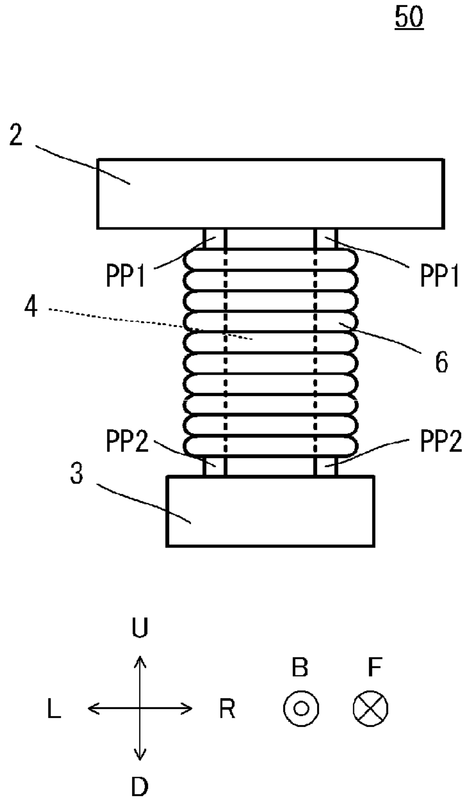
FIG. 11 is a plan view of the magnetic core 1 and the winding portion 6 according to the first embodiment as viewed in the front direction.

Hereinafter, a configuration of a magnetic core 1 according to a first embodiment of the present invention will be described with reference to the drawings. FIG. 1 is a perspective view of the magnetic core 1 according to the first embodiment. FIG. 2 is a plan view of a back yoke portion 2 according to the first embodiment as viewed in the upward direction. FIG. 3 is a plan view of the back yoke portion 2 according to the first embodiment as viewed in the front direction. FIG. 4 is a plan view of a tooth distal end portion 3 according to the first embodiment as viewed in the downward direction. FIG. 5 is a plan view of the tooth distal end portion 3 according to the first embodiment as viewed in the front direction. FIG. 6 is a plan view of the magnetic core 1 according to the first embodiment as viewed in the upward direction. FIG. 7 is a perspective view of the magnetic core 1 and a conductor 5 according to the first embodiment. FIG. 8 is a plan view of the back yoke portion 2 and a winding portion 6 according to the first embodiment as viewed in the upward direction. FIG. 9 is a plan view of the tooth distal end portion 3 and the winding portion 6 according to the first embodiment as viewed in the downward direction. FIG. 10 is a plan view of the magnetic core 1 and the winding portion 6 according to the first embodiment as viewed in the upward direction. FIG. 11 is a plan view of the magnetic core 1 and the winding portion 6 according to the first embodiment as viewed in the front direction. In FIGS. 1, 2, and 6 to 8, only a representative first protrusion P1 among a plurality of first protrusions P1 is denoted by a reference numeral. In FIGS. 4 and 9, only a representative second protrusion P2 among a plurality of second protrusions P2 is denoted by a reference numeral. In FIG. 8, only a representative first portion PP1 among a plurality of first portions PP1 is denoted by a reference numeral. In FIG. 9, only a representative second portion PP2 among a plurality of second portions PP2 is denoted by a reference numeral.

The magnetic core 1 is used in a brushless motor 100 in which a rotor 20 rotates. The brushless motor 100 is an example of a rotary electric machine of the present invention.

As illustrated in FIG. 1, the magnetic core 1 includes the back yoke portion 2, the tooth distal end portion 3, and the tooth portion 4. The material of the magnetic core 1 is, for example, a powder magnetic core. The powder magnetic core is a mixture of a metal magnetic powder such as iron powder and a resin compound. The magnetic core 1 is manufactured by, for example, injection molding. The outer surface of the magnetic core 1 is subjected to insulation processing.

As illustrated in FIG. 1, the back yoke portion 2 has a first upper surface US1 and a first lower surface DS1 arranged in the up-down direction. The first upper surface US1 is located above the first lower surface DS1. As illustrated in FIG. 2, each of the first upper surface US1 and the first lower surface DS1 has a front side, a rear side, a left side, and a right side as viewed in the up-down direction. In the present embodiment, the lengths of the left side and the right side of each of the first upper surface US1 and the first lower surface DS1 are longer than the lengths of the front side and the rear side of each of the first upper surface US1 and the first lower surface DS1, respectively, as illustrated in FIG. 2. In the present embodiment, the outer edge of the first lower surface DS1 viewed in the up-down direction coincides with the outer edge of the first upper surface US1 viewed in the up-down direction.

As illustrated in FIG. 3, the first lower surface DS1 is provided with one or more first protrusions P1 having a shape protruding in the downward direction. In the present embodiment, the first lower surface DS1 is provided with the plurality of first protrusions P1. In the present embodiment, the plurality of first protrusions P1 are not in contact with each other. As illustrated in FIG. 2, the plurality of first protrusions P1 include first left protrusions PL1 located to the left of the tooth portion 4 and first right protrusions PR1 located to the right of the tooth portion 4 as viewed in the up-down direction. More specifically, the plurality of first protrusions P1 located to the left of the tooth portion 4 are arranged in the front-rear direction as viewed in the up-down direction. The plurality of first protrusions P1 located to the right of the tooth portion 4 are arranged in the front-rear direction as viewed in the up-down direction. That is, the plurality of first protrusions P1 are arranged in the front-rear direction as viewed in the up-down direction.

As illustrated in FIG. 1, the tooth distal end portion 3 has a second upper surface US2 and a second lower surface DS2 arranged in the up-down direction. The second upper surface US2 is located above the second lower surface DS2. As illustrated in FIG. 4, the second lower surface DS2 has a front side, a rear side, a left side, and a right side as viewed in the up-down direction. In the present embodiment, the lengths of the left side and the right side of each of the second upper surface US2 and the second lower surface DS2 are longer than the lengths of the front side and the rear side of each of the second upper surface US2 and the second lower surface DS2, respectively, as illustrated in FIG. 4. In the present embodiment, the outer edge of the second lower surface DS2 viewed in the up-down direction coincides with the outer edge of the second upper surface US2 viewed in the up-down direction.

As illustrated in FIG. 5, the second upper surface US2 is provided with one or more second protrusions P2 having a shape protruding in the upward direction. In the present embodiment, the second upper surface US2 is provided with the plurality of second protrusions P2. In the present embodiment, the plurality of second protrusions P2 are not in contact with each other. As illustrated in FIG. 4, the plurality of second protrusions P2 include second left protrusions PL2 located to the left of the tooth portion 4 and second right protrusions PR2 located to the right of the tooth portion 4 as viewed in the up-down direction. More specifically, the plurality of second protrusions P2 located to the left of the tooth portion 4 are arranged in the front-rear direction as viewed in the up-down direction. The plurality of second protrusions P2 located to the right of the tooth portion 4 are arranged in the front-rear direction as viewed in the up-down direction. That is, the plurality of second protrusions P2 are arranged in the front-rear direction as viewed in the up-down direction.

As illustrated in FIG. 1, the tooth portion 4 has a shape extending in the up-down direction. The upper end of the tooth portion 4 is in contact with the first lower surface DS1 of the back yoke portion 2. The lower end of the tooth portion 4 is in contact with the second upper surface US2 of the tooth distal end portion 3. That is, the tooth portion 4 has an upper end in contact with the first lower surface DS1 of the back yoke portion 2 and a lower end in contact with the second upper surface US2 of the tooth distal end portion 3.

As illustrated in FIGS. 2 and 4, the tooth portion 4 has a left side extending in the front-rear direction and a right side extending in the front-rear direction as viewed in the up-down direction. The left side of the tooth portion 4 includes the left end of the tooth portion 4. The right side of the tooth portion 4 includes the right end of the tooth portion 4. That is, the left side of the tooth portion 4 is located to the left of the right side of the tooth portion 4.

In the present embodiment, as illustrated in FIG. 2, the first protrusions P1 are in contact with the left side of the tooth portion 4 as viewed in the up-down direction. More specifically, the first left protrusions PL1 located to the left of the tooth portion 4 are in contact with the left side of the tooth portion 4 as viewed in the up-down direction. In addition, the first protrusions P1 are in contact with the right side of the tooth portion 4 as viewed in the up-down direction. More specifically, the first right protrusions PR1 located to the right of the tooth portion 4 are in contact with the right side of the tooth portion 4 as viewed in the up-down direction.

In the present embodiment, as illustrated in FIG. 4, the second protrusions P2 are in contact with the left side of the tooth portion 4 as viewed in the up-down direction. More specifically, the second left protrusions PL2 located to the left of the tooth portion 4 are in contact with the left side of the tooth portion 4 as viewed in the up-down direction. In addition, the second protrusions P2 are in contact with the right side of the tooth portion 4 as viewed in the up-down direction. More specifically, the second right protrusions PR2 located to the right of the tooth portion 4 are in contact with the right side of the tooth portion 4 as viewed in the up-down direction.

As illustrated in FIG. 6, an outer edge OE2 of the back yoke portion 2 viewed in the up-down direction surrounds an outer edge OE3 of the tooth distal end portion 3 viewed in the up-down direction. That is, the outer edge OE3 of the tooth distal end portion 3 viewed in the up-down direction does not protrude from a region surrounded by the outer edge OE2 of the back yoke portion 2 viewed in the up-down direction, and the outer edge OE3 of the tooth distal end portion 3 viewed in the up-down direction does not have a portion overlapping the outer edge OE2 of the back yoke portion 2 viewed in the up-down direction. The outer edge OE3 of the tooth distal end portion 3 viewed in the up-down direction surrounds an outer edge OE4 of the tooth portion 4 viewed in the up-down direction. That is, the outer edge OE4 of the tooth portion 4 viewed in the up-down direction does not protrude from a region surrounded by the outer edge OE3 of the tooth distal end portion 3 viewed in the up-down direction, and the outer edge OE4 of the tooth portion 4 viewed in the up-down direction does not have a portion overlapping the outer edge OE3 of the tooth distal end portion 3 viewed in the up-down direction.

The winding portion 6 of the conductor 5 is wound around the tooth portion 4 as viewed in the up-down direction. More specifically, as illustrated in FIG. 7, the conductor 5 includes the winding portion 6. The conductor 5 is made of, for example, a conductive material such as copper. The conductor 5 has a structure in which the surface of the copper wire is covered with an insulating film. The conductor 5 has a first end and a second end.

As illustrated in FIG. 7, the winding portion 6 is wound around the tooth portion 4 so as to be located around the tooth portion 4 as viewed in the up-down direction. That is, the winding portion 6 circles around the tooth portion 4 in the clockwise direction or the counterclockwise direction as viewed in the up-down direction. In the present embodiment, the winding portion 6 is wound around the tooth portion 4 in double layers so as to be located around the tooth portion 4 as viewed in the up-down direction.

As illustrated in FIG. 8, the first lower surface DS1 of the back yoke portion 2 has a first region A1 overlapping the winding portion 6 as viewed in the up-down direction in a state where the winding portion 6 is wound around the tooth portion 4. The first region A1 has an annular shape that makes one lap around the tooth portion 4 as viewed in the up-down direction. The first protrusions P1 include first portions PP1 located in the first region A1. The total area of the lower ends of the first portions PP1 viewed in the up-down direction is smaller than the area of the first region A1 viewed in the up-down direction.

As illustrated in FIG. 9, the second upper surface US2 of the tooth distal end portion 3 has a second region A2 overlapping the winding portion 6 as viewed in the up-down direction in a state where the winding portion 6 is wound around the tooth portion 4. The second region A2 has an annular shape that makes one lap around the tooth portion 4 as viewed in the up-down direction. The second protrusions P2 include second portions PP2 located in the second region A2. The total area of the upper ends of the second portions PP2 viewed in the up-down direction is smaller than the area of the second region A2 viewed in the up-down direction.

The first lower surface DS1 is in contact with the winding portion 6 at the lower ends of the first portions PP1. That is, as illustrated in FIGS. 10 and 11, the first protrusions P1 include portions located above the winding portion 6. The contact area between the back yoke portion 2 and the winding portion 6 is the total area of the lower ends of the first portions PP1 viewed in the up-down direction.

The second upper surface US2 is in contact with the winding portion 6 at the upper ends of the second portions PP2. That is, as illustrated in FIGS. 10 and 11, the second protrusions P2 include portions located below the winding portion 6. The contact area between the tooth distal end portion 3 and the winding portion 6 is the total area of the upper ends of the second portions PP2 viewed in the up-down direction.

(Configuration of Brushless Motor 100)

Figure 12:
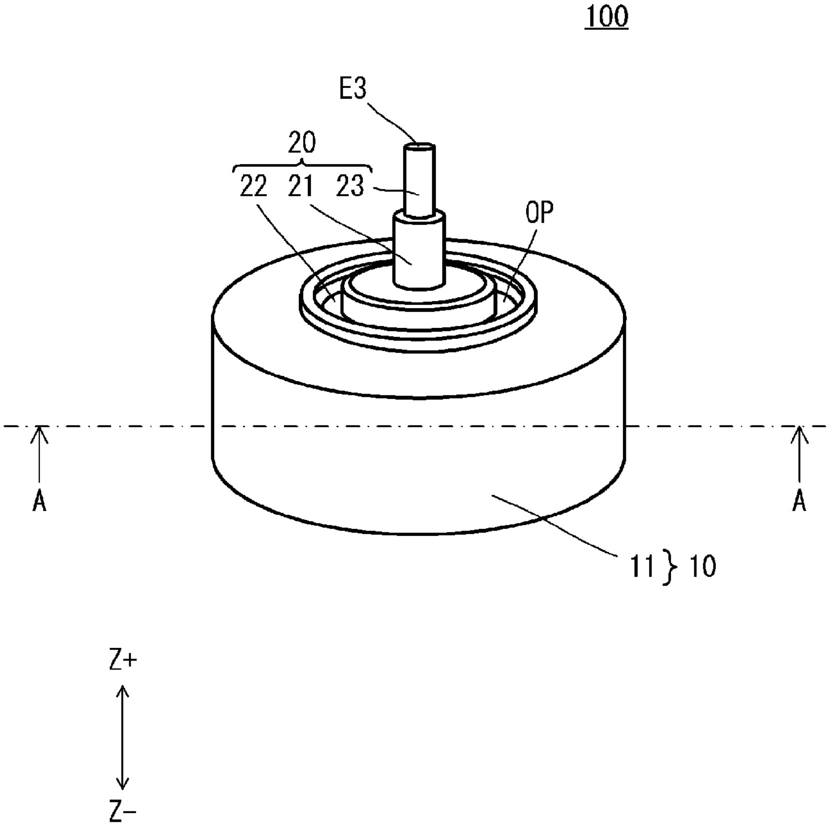
FIG. 12 is an external perspective view of the brushless motor 100 using the magnetic core 1 according to the first embodiment.
Figure 13:
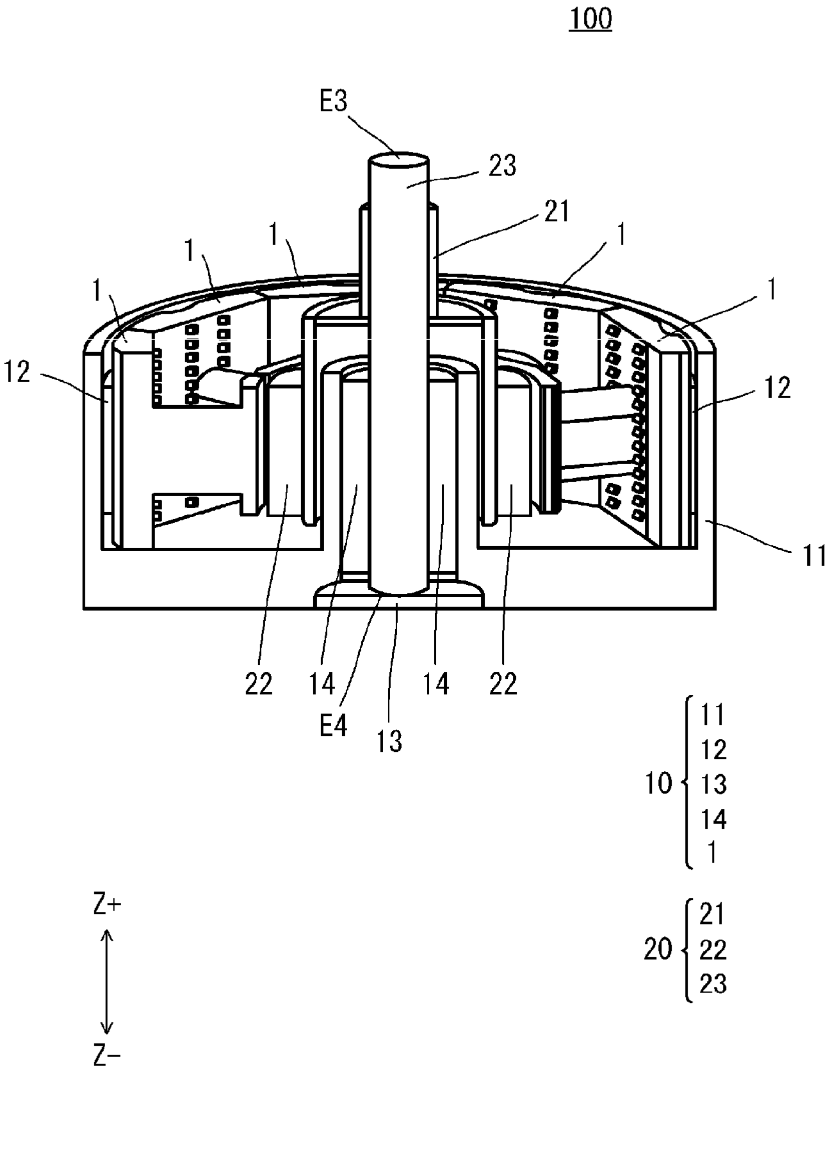
FIG. 13 is an exploded perspective view of the brushless motor 100 using the magnetic core 1 according to the first embodiment.
Figure 14:
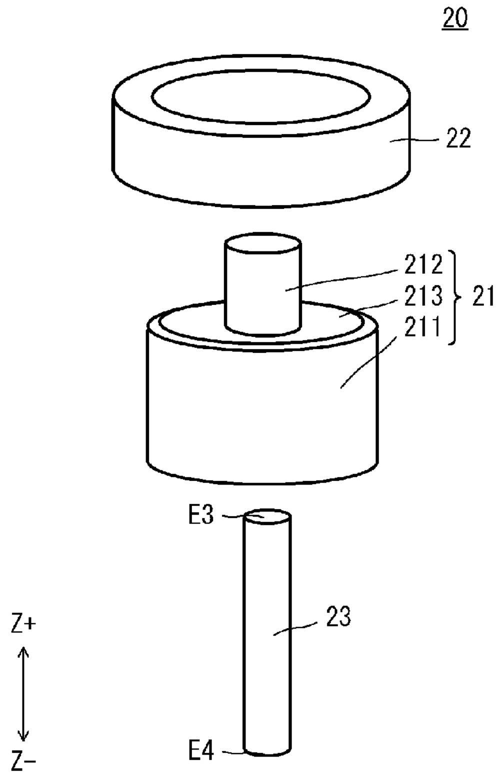
FIG. 14 is an exploded perspective view of a rotor 20 according to the first embodiment.
Figure 15:
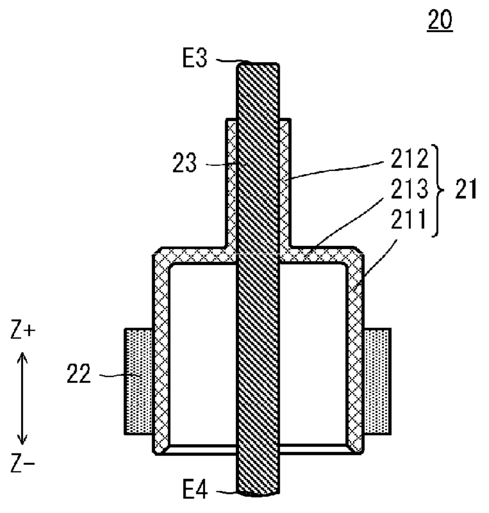
FIG. 15 is a cross-sectional view taken along line A-A of the rotor 20 according to the first embodiment.

Hereinafter, a configuration of the brushless motor 100 according to the first embodiment of the present invention will be described with reference to the drawings. FIG. 12 is an external perspective view of the brushless motor 100 using the magnetic core 1 according to the first embodiment. FIG. 13 is an exploded perspective view of the brushless motor 100 using the magnetic core 1 according to the first embodiment. In FIG. 13, the plurality of conductors 5 are omitted. FIG. 14 is an exploded perspective view of the rotor 20 according to the first embodiment. FIG. 15 is a cross-sectional view taken along line A-A of the rotor 20 according to the first embodiment.

As illustrated in FIG. 12, the brushless motor 100 includes a stator assembly 10 and the rotor 20. The magnetic core 1 and the conductor 5 are components of the stator assembly 10. That is, the brushless motor 100 includes the magnetic core 1 and the conductor 5.

As illustrated in FIGS. 12 and 13, the stator assembly 10 includes a casing 11, an insulating member 12, a shaft lid member 13, a bearing 14, a plurality of magnetic cores 1, and the plurality of conductors 5.

As illustrated in FIG. 12, the casing 11 has a cylindrical shape. The axial direction of the cylindrical shape is the Z-axis direction. The material of the casing 11 is, for example, a material having high rigidity such as SUS.

As illustrated in FIG. 13, the insulating member 12 is disposed between the casing 11 and the plurality of magnetic cores 1 as viewed in the Z-axis direction. The casing 11 and the plurality of magnetic cores 1 are electrically insulated by the insulating member 12. The insulating member 12 is, for example, insulating paper.

As illustrated in FIG. 13, the shaft lid member 13 has a circular shape and a plate shape. The center of the circular shape coincides with the central axis of the shaft 23 described later as viewed in the Z-axis direction. The shaft lid member 13 overlaps the shaft 23 described later as viewed in the Z-axis direction. The shaft lid member 13 is disposed in the Z− direction from a fourth end E4 of the shaft 23 described later.

As illustrated in FIG. 13, the bearing 14 has a cylindrical shape. The axial direction of the cylindrical shape (the central axis of the bearing 14) is the Z-axis direction. The center of the cylindrical shape coincides with the central axis of the shaft 23 described later as viewed in the Z-axis direction. The bearing 14 supports the shaft 23 described later so as to be rotatable about the Z-axis direction.

Each of the plurality of magnetic cores 1 is arranged around the rotor 20 at intervals along the direction around the Z-axis direction. As illustrated in FIG. 7, each of the winding portions 6 of the plurality of conductors 5 is wound around the tooth portion 4 so as to be located around the tooth portion 4 as viewed in the up-down direction. The plurality of magnetic cores 1 and the plurality of conductors 5 form a stator.

As illustrated in FIGS. 12 and 13, the rotor 20 includes a rotor yoke 21, a magnet 22, and a shaft 23.

As illustrated in FIG. 14, the rotor yoke 21 includes a main body portion 211, a shaft holding portion 212, and a coupling portion 213. The material of the rotor yoke 21 is magnetized metal such as stainless used steel (SUS).

As illustrated in FIG. 14, the main body portion 211 has a cylindrical shape. The axial direction of the cylindrical shape (the central axis of the main body portion 211) is the Z-axis direction. The central axis of the main body portion 211 coincides with the central axis of the shaft 23 described later.

As illustrated in FIG. 14, the shaft holding portion 212 has a cylindrical shape. The axial direction of the cylindrical shape (the central axis of the shaft holding portion 212) is the Z-axis direction. The central axis of the shaft holding portion 212 coincides with the central axis of the shaft 23 described later. In addition, the shaft holding portion 212 is arranged in the Z+ direction from the end of the main body portion 211 in the Z+ direction. The shaft holding portion 212 is disposed such that an outer edge of the shaft holding portion 212 viewed in the Z-axis direction is surrounded by an inner edge of the main body portion 211 viewed in the Z-axis direction. The shaft holding portion 212 holds the shaft 23.

As illustrated in FIG. 14, the coupling portion 213 has an annular shape and a plate shape. The center of the annular shape coincides with the central axis of the shaft 23 described later as viewed in the Z-axis direction. Further, the coupling portion 213 has a main surface whose normal direction is the Z-axis direction. The coupling portion 213 couples the main body portion 211 and the shaft holding portion 212.

As illustrated in FIG. 14, the magnet 22 has a cylindrical shape. The axial direction of the cylindrical shape (the central axis of the magnet 22) is the Z-axis direction. The central axis of the magnet 22 coincides with the central axis of the shaft 23 described later. An inner edge of the magnet 22 viewed in the Z-axis direction coincides with an outer edge of the main body portion 211 viewed in the Z-axis direction.

As illustrated in FIG. 14, the shaft 23 has a cylindrical shape. The axial direction of the cylindrical shape (the central axis of the shaft 23) is the Z-axis direction. The outer edge of the shaft 23 viewed in the Z-axis direction coincides with the inner edge of the shaft holding portion 212 viewed in the Z-axis direction. The shaft 23 has a third end E3 and the fourth end E4 in the Z-axis direction. The third end E3 is located in the Z+ direction from the fourth end E4. As illustrated in FIG. 13, the third end E3 is located in the Z+ direction from the end of the main body portion 211 in the Z+ direction. The fourth end E4 is located in the Z− direction from the end of the main body portion 211 in the Z− direction.

As illustrated in FIG. 12, the stator assembly 10 has an opening OP. The rotor 20 is inserted from the opening OP into a region surrounded by the inner edge of the stator as viewed in the Z-axis direction. As a result, the rotor 20 is disposed so as to be surrounded by the stator as viewed in the Z-axis direction. In other words, the stator is disposed around the rotor 20 as viewed in the Z-axis direction. That is, in the present embodiment, the brushless motor 100 is an inner rotor type.

As illustrated in FIG. 12, the third end E3 of the shaft 23 protrudes from the opening OP in the Z+ direction. As illustrated in FIG. 13, the fourth end E4 is supported by the stator assembly 10 such that the shaft 23 can rotate about the Z-axis direction. That is, in the present embodiment, the brushless motor 100 is a single-shaft type.

The stator is supplied with an electrical signal from a power supply (not illustrated). More specifically, an electric signal is supplied from a power supply to the first end and the second end of the plurality of conductors 5. By controlling the electric signal, the rotation of the rotor 20 is controlled.

Effects

According to the magnetic core 1, electrical insulation between the iron core and the winding can be improved. More specifically, one or more first protrusions P1 having a shape protruding in the downward direction are provided on the first lower surface DS1 of the back yoke portion 2. As a result, the first lower surface DS1 comes into contact with the winding portion 6 with the first protrusions P1 interposed therebetween. Therefore, according to the magnetic core 1, the contact area between the back yoke portion 2 and the winding portion 6 can be made smaller than the contact area between the back yoke portion 2 and the winding portion 6 when the back yoke portion 2 comes into contact with the winding portion 6 with the entire first region A1 overlapping the winding portion 6. As a result, according to the magnetic core 1, electrical insulation between the iron core and the winding can be improved.

According to the magnetic core 1, electrical insulation between the iron core and the winding can be improved. More specifically, one or more second protrusions P2 having a shape protruding in the upward direction are provided on the second upper surface US2 of the tooth distal end portion 3. As a result, the second upper surface US2 comes into contact with the winding portion 6 with the second protrusions P2 interposed therebetween. Therefore, according to the magnetic core 1, the contact area between the tooth distal end portion 3 and the winding portion 6 can be made smaller than the contact area between the tooth distal end portion 3 and the winding portion 6 when the tooth distal end portion 3 is in contact with the winding portion 6 with the entire second region A2 overlapping the winding portion 6. As a result, according to the magnetic core 1, electrical insulation between the iron core and the winding can be improved.

According to the magnetic core 1, electrical insulation between the iron core and the winding can be improved. More specifically, the first protrusions P1 include the first portions PP1 located in the first region A1. As a result, the first lower surface DS1 comes into contact with the winding portion 6 with the first portions PP1 interposed therebetween. The total area of the lower ends of the first portions PP1 viewed in the up-down direction is smaller than the area of the first region A1 viewed in the up-down direction. Therefore, the contact area between the back yoke portion 2 and the winding portion 6 is smaller than the contact area between the back yoke portion 2 and the winding portion 6 when the back yoke portion 2 comes into contact with the winding portion 6 with the entire first region A1 overlapping the winding portion 6. As a result, according to the magnetic core 1, electrical insulation between the iron core and the winding can be improved.

According to the magnetic core 1, electrical insulation between the iron core and the winding can be improved. More specifically, the second protrusions P2 include the second portions PP2 located in the second region A2. As a result, the second upper surface US2 comes into contact with the winding portion 6 with the second portions PP2 interposed therebetween. The total area of the lower ends of the second portions PP2 viewed in the up-down direction is smaller than the area of the second region A2 viewed in the up-down direction. Therefore, the contact area between the tooth distal end portion 3 and the winding portion 6 is smaller than the contact area between the tooth distal end portion 3 and the winding portion 6 when the tooth distal end portion 3 comes into contact with the winding portion 6 with the entire second region A2 overlapping the winding portion 6. As a result, according to the magnetic core 1, electrical insulation between the iron core and the winding can be improved.

[First Modification]

Figure 16:
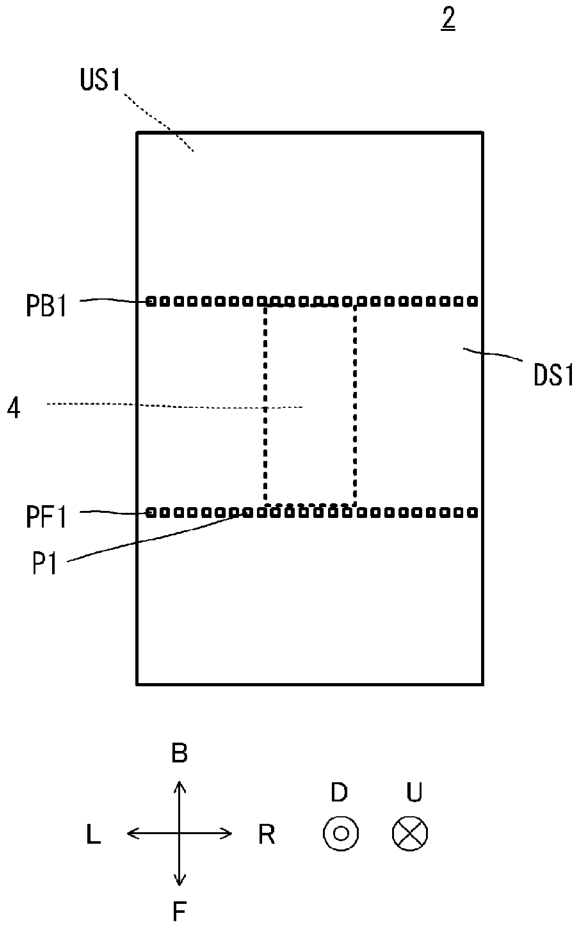
FIG. 16 is a plan view of a back yoke portion 2 according to a first modification as viewed in the upward direction.
Figure 17:
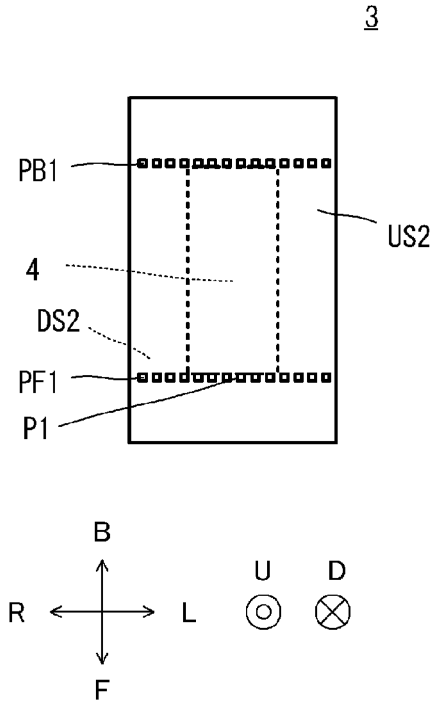
FIG. 17 is a plan view of a tooth distal end portion 3 according to the first modification as viewed in the downward direction.
Figure 18:
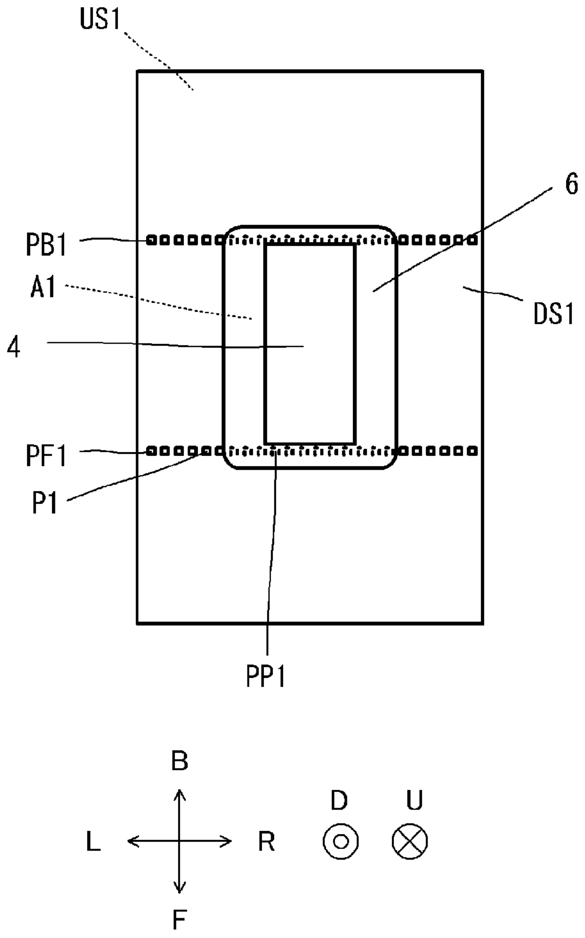
FIG. 18 is a plan view of the back yoke portion 2 and a winding portion 6 according to the first modification as viewed in the upward direction.
Figure 19:
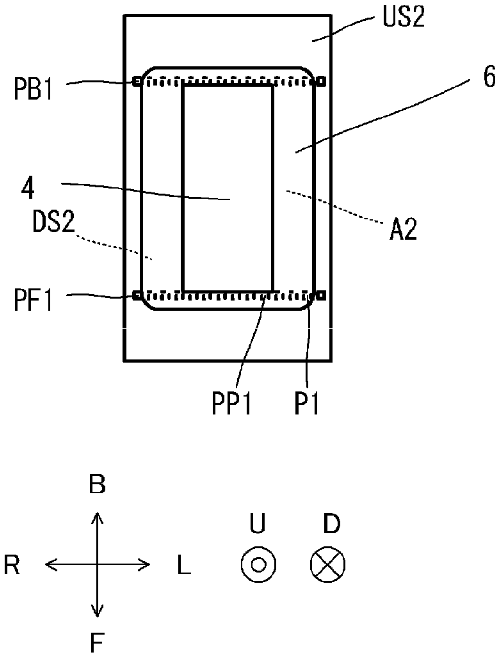
FIG. 19 is a plan view of the tooth distal end portion 3 and the winding portion 6 according to the first modification as viewed in the downward direction.

Hereinafter, a magnetic core 1*a* according to a first modification of the present invention will be described with reference to the drawings. FIG. 16 is a plan view of a back yoke portion 2 according to the first modification as viewed in the upward direction. FIG. 17 is a plan view of a tooth distal end portion 3 according to the first modification as viewed in the downward direction. FIG. 18 is a plan view of the back yoke portion 2 and a winding portion 6 according to the first modification as viewed in the upward direction. FIG. 19 is a plan view of the tooth distal end portion 3 and the winding portion 6 according to the first modification as viewed in the downward direction. In FIGS. 16 and 18, only a representative first protrusion P1 among a plurality of first protrusions P1 is denoted by a reference numeral. In FIGS. 17 and 19, only a representative second protrusion P2 among a plurality of second protrusions P2 is denoted by a reference numeral. In FIG. 18, only a representative first portion PP1 among a plurality of first portions PP1 is denoted by a reference numeral. In FIG. 19, only a representative second portion PP2 among a plurality of second portions PP2 is denoted by a reference numeral. Note that, regarding the magnetic core 1*a* according to the first modification, only portions different from those of the magnetic core 1 according to the first embodiment will be described, and the description thereof will be omitted.

The magnetic core 1*a* is different from the magnetic core 1 in that the plurality of first protrusions P1 are arranged in the left-right direction as viewed in the up-down direction as illustrated in FIG. 16, and that the plurality of second protrusions P2 are arranged in the left-right direction as viewed in the up-down direction as illustrated in FIG. 17.

As illustrated in FIG. 16, the plurality of first protrusions P1 include first front protrusions PF1 located in front of the tooth portion 4 as viewed in the up-down direction, and first rear protrusions PB1 located behind the tooth portion 4 as viewed in the up-down direction. More specifically, the plurality of first protrusions P1 located in front of the tooth portion 4 are arranged in the left-right direction as viewed in the up-down direction. The plurality of first protrusions P1 located behind the tooth portion 4 are arranged in the left-right direction as viewed in the up-down direction.

As illustrated in FIG. 17, the plurality of second protrusions P2 include second front protrusions PF2 located in front of the tooth portion 4 as viewed in the up-down direction, and second rear protrusions PB2 located behind the tooth portion 4 as viewed in the up-down direction. More specifically, the plurality of second protrusions P2 located in front of the tooth portion 4 are arranged in the left-right direction as viewed in the up-down direction. The plurality of second protrusions P2 located behind the tooth portion 4 are arranged in the left-right direction as viewed in the up-down direction.

As illustrated in FIGS. 16 and 17, the tooth portion 4 has a front side extending in the left-right direction and a rear side extending in the left-right direction as viewed in the up-down direction. The front side of the tooth portion 4 includes the front end of the tooth portion 4. The rear side of the tooth portion 4 includes the rear end of the tooth portion 4. That is, the front side of the tooth portion 4 is located in front of the rear side of the tooth portion 4.

In the present modification, as illustrated in FIG. 16, the first protrusions P1 are in contact with the front side of the tooth portion 4 as viewed in the up-down direction. More specifically, the first front protrusions PF1 located in front of the tooth portion 4 are in contact with the front side of the tooth portion 4 as viewed in the up-down direction. In addition, the first protrusions P1 are in contact with the rear side of the tooth portion 4 as viewed in the up-down direction. More specifically, the first rear protrusions PB1 located behind the tooth portion 4 are in contact with the rear side of the tooth portion 4 as viewed in the up-down direction.

In the present modification, as illustrated in FIG. 4, the second protrusions P2 are in contact with the front side of the tooth portion 4 as viewed in the up-down direction. More specifically, the second front protrusions PF2 located in front of the tooth portion 4 are in contact with the front side of the tooth portion 4 as viewed in the up-down direction. The second protrusions P2 are in contact with the rear side of the tooth portion 4 as viewed in the up-down direction. More specifically, the second rear protrusions PB2 located behind the tooth portion 4 are in contact with the rear side of the tooth portion 4 as viewed in the up-down direction.

As illustrated in FIG. 18, the total area of the lower ends of the first portions PP1 viewed in the up-down direction is smaller than the area of the first region A1 viewed in the up-down direction. As illustrated in FIG. 19, the total area of the lower ends of the second portions PP2 viewed in the up-down direction is smaller than the area of the second region A2 viewed in the up-down direction.

Also in the magnetic core 1*a* as described above, the same effect as that of the magnetic core 1 is obtained.

[Second Modification]

Figure 20:
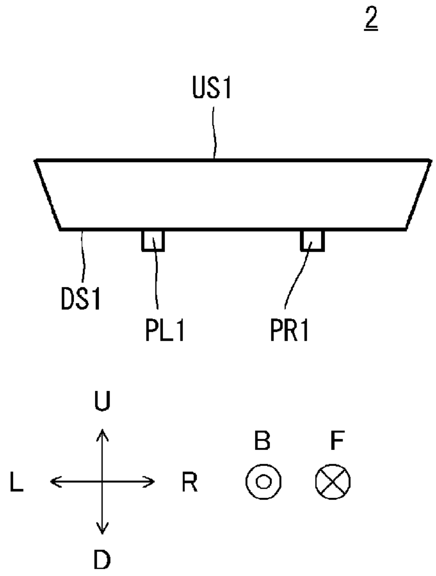
FIG. 20 is a plan view of a back yoke portion 2 according to a second modification as viewed in the front direction.

Hereinafter, a magnetic core 1*b* according to a second modification of the present invention will be described with reference to the drawings. FIG. 20 is a plan view of a back yoke portion 2 according to the second modification as viewed in the front direction. Note that, regarding the magnetic core 1*b* according to the second modification, only portions different from those of the magnetic core 1 according to the first embodiment will be described, and the description thereof will be omitted.

As illustrated in FIG. 20, the magnetic core 1*b* is different from the magnetic core 1 in that the length of the first upper surface US1 in the left-right direction is longer than the length of the first lower surface DS1 in the left-right direction.

Also in the magnetic core 1*b* as described above, the same effect as that of the magnetic core 1 is obtained. Furthermore, according to the magnetic core 1*b*, the magnetic core 1*b* can be easily disposed in the brushless motor 100.

[Third Modification]

Figure 21:
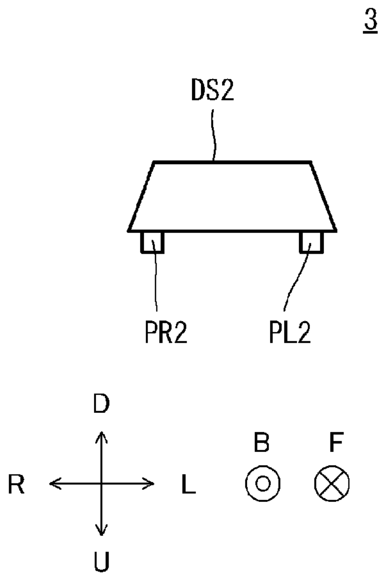
FIG. 21 is a plan view of a back yoke portion 2 according to a third modification as viewed in the front direction.

Hereinafter, a magnetic core 1*c* according to a third modification of the present invention will be described with reference to the drawings. FIG. 21 is a plan view of a back yoke portion 2 according to the third modification as viewed in the front direction. Note that, regarding the magnetic core 1*c* according to the third modification, only portions different from those of the magnetic core 1 according to the first embodiment will be described, and the description thereof will be omitted.

As illustrated in FIG. 21, the magnetic core 1*c* is different from the magnetic core 1 in that the length of the second upper surface US2 in the left-right direction is longer than the length of the second lower surface DS2 in the left-right direction.

Also in the magnetic core 1*c* as described above, the same effect as that of the magnetic core 1 is obtained. Further, according to the magnetic core 1*c*, the magnetic core 1*c* is easily disposed in the brushless motor 100.

OTHER EMBODIMENTS

The magnetic core according to the present invention is not limited to the magnetic cores 1 and 1*a* to 1*c*, and can be modified within the scope of the gist thereof. In addition, the structures of the magnetic cores 1 and 1*a* to 1*c* may be arbitrarily combined.

Note that any one of the magnetic cores 1 and 1*a* to 1*c* and the conductor 5 may be modularized to form a winding 50, 50*a* to 50*c* with a magnetic core.

The brushless motor 100 may include any one of the magnetic cores 1 and 1*a* to 1*c*.

Note that the brushless motor 100 may not include the plurality of magnetic cores 1, for example. The brushless motor 100 may include, for example, one magnetic core 1. The brushless motor 100 may not include the plurality of conductors 5. The brushless motor 100 may include one conductor 5.

The brushless motor 100 is not limited to the inner rotor type. The brushless motor 100 may be, for example, an outer rotor type.

The brushless motor 100 is not limited to the single-shaft type. The brushless motor 100 may be, for example, a double-shaft type.

The material of the casing 11 may be a material other than SUS. The material of the casing 11 may be a material having high rigidity.

The insulating member 12 may be, for example, an insulating resin. In this case, the magnetic core 1 is fixed to the casing 11 by the insulating member 12.

The rotary electric machine is not limited to the brushless motor 100. The rotary electric machine may have a structure in which the rotor 20 rotates. In this case, the rotary electric machine may include any one of the magnetic cores 1 and 1*a* to 1*c*.

Note that the material of the magnetic core 1 is not limited to the powder magnetic core. The material of the magnetic core 1 may be, for example, a laminated magnetic core. The laminated magnetic core is formed by laminating electromagnetic steel plates and the like. The material of the magnetic core 1 may be a magnetic body.

When the first protrusions P1 are provided on the first lower surface DS1, the second protrusions P2 may not be provided on the second upper surface US2. When the second protrusions P2 are provided on the second upper surface US2, the first protrusions P1 may not be provided on the first lower surface DS1.

The length of the first upper surface US1 in the front-rear direction may be equal to the length of the first upper surface US1 in the left-right direction. The length of the first upper surface US1 in the front-rear direction may be shorter than the length of the first upper surface US1 in the left-right direction.

The length of the first lower surface DS1 in the front-rear direction may be equal to the length of the first lower surface DS1 in the left-right direction. The length of the first lower surface DS1 in the front-rear direction may be shorter than the length of the first lower surface DS1 in the left-right direction.

The length of the second upper surface US2 in the front-rear direction may be equal to the length of the second upper surface US2 in the left-right direction. The length of the second upper surface US2 in the front-rear direction may be shorter than the length of the second upper surface US2 in the left-right direction.

The length of the second lower surface DS2 in the front-rear direction may be equal to the length of the second lower surface DS2 in the left-right direction. The length of the second lower surface DS2 in the front-rear direction may be shorter than the length of the second lower surface DS2 in the left-right direction.

Each of the first upper surface US1, the first lower surface DS1, the second upper surface US2, and the second lower surface DS2 may have a curved surface. The first upper surface US1 may have, for example, an arc shape.

Note that the conductor 5 is not limited to being made of copper or the like. The conductor 5 may be made of, for example, aluminum. The conductor 5 may be made of a conductive material.

Note that the magnetic core 1 is not limited to being manufactured by injection molding. The magnetic core 1 may be manufactured by transfer molding.

The winding portion 6 is not limited to be wound around the tooth portion 4 in double layers so as to be located around the tooth portion 4 as viewed in the up-down direction. For example, the winding portion 6 may be wound around the tooth portion 4 in a single layer so as to be located around the tooth portion 4 as viewed in the up-down direction. Further, for example, the winding portion 6 may be wound around the tooth portion 4 in triple or more layers so as to be located around the tooth portion 4 as viewed in the up-down direction.

The number of first protrusions P1 is not limited to a plurality. The number of first protrusions P1 may be one.

The number of second protrusions P2 is not limited to one. The number of second protrusions P2 may be one.

The plurality of first protrusions P1 may be in contact with each other.

The plurality of second protrusions P2 may be in contact with each other.

The plurality of first protrusions P1 may not be arranged in the front-rear direction as viewed in the up-down direction. The plurality of first protrusions P1 may not be arranged in the left-right direction as viewed in the up-down direction.

The plurality of second protrusions P2 may not be arranged in the front-rear direction as viewed in the up-down direction. The plurality of second protrusions P2 may not be arranged in the left-right direction as viewed in the up-down direction.

The first protrusions P1 may not be in contact with the left side of the tooth portion 4 as viewed in the up-down direction. In addition, the first protrusions P1 may not be in contact with the right side of the tooth portion 4 as viewed in the up-down direction. In addition, the first protrusions P1 may not be in contact with the front side of the tooth portion 4 as viewed in the up-down direction. In addition, the first protrusions P1 may not be in contact with the rear side of the tooth portion 4 as viewed in the up-down direction.

The second protrusions P2 may not be in contact with the left side of the tooth portion 4 as viewed in the up-down direction. In addition, the second protrusions P2 may not be in contact with the right side of the tooth portion 4 as viewed in the up-down direction. In addition, the second protrusions P2 may not be in contact with the front side of the tooth portion 4 as viewed in the up-down direction. In addition, the second protrusions P2 may not be in contact with the rear side of the tooth portion 4 as viewed in the up-down direction.

The first protrusions P1 may have, for example, an elliptic cone shape, an elliptic cylinder shape, a conical shape, a cylindrical shape, a pyramid shape, or a prismatic shape. The lower end of the first protrusion P1 may be a point, a line, or a plane as viewed in the up-down direction. The lower end of the first portion PP1 may be a point, a line, or a plane as viewed in the up-down direction.

The second protrusions P2 may have, for example, an elliptic cone shape, an elliptic cylinder shape, a conical shape, a cylindrical shape, a pyramid shape, or a prismatic shape. The upper end of the second protrusion P2 may be a point, a line, or a plane as viewed in the up-down direction. The upper end of the second portion PP2 may be a point, a line, or a plane as viewed in the up-down direction.

DESCRIPTION OF REFERENCE SYMBOLS

1, 1*a*, 1*b*, 1*c*: Magnetic core
2: Back yoke portion
3: Tooth distal end portion
4: Tooth portion
5: Conductor
6: Winding portion
10: Stator assembly
11: Casing
12: Insulating member
13: Shaft lid member
14: Bearing
20: Rotor
21: Rotor yoke
22: Magnet
23: Shaft
50, 50*a*, 50*b*, 50*c*: Winding with magnetic core
100: Brushless motor
211: Main body portion
212: Shaft holding portion
213: Coupling portion
A1: First region
A2: Second region
DS1: First lower surface
DS2: Second lower surface
E3: Third end
E4: Fourth end
OE2: Outer edge
OE3: Outer edge
OE4: Outer edge
OP: Opening
P1: First protrusion
P2: Second protrusion
PB1: First rear protrusion
PB2: Second rear protrusion
PF1: First front protrusion
PF2: Second front protrusion
PL1: First left protrusion
PL2: Second left protrusion
PP1: First portion
PP2: Second portion
PR1: First right protrusion
PR2: Second right protrusion
US1: First upper surface
US2: Second upper surface

The invention claimed is:

1. A magnetic core comprising:

a back yoke portion having a first upper surface and a first lower surface aligned in an up-down direction;

a tooth distal end portion having a second upper surface and a second lower surface aligned in the up-down direction; and a tooth portion extending in the up-down direction and having an upper end in contact with the first lower surface and a lower end in contact with the second upper surface, the tooth portion constructed to have a winding portion of a conductor wound around the tooth portion as viewed in the up-down direction, wherein an outer edge of the back yoke portion viewed in the up-down direction surrounds an outer edge of the tooth distal end portion viewed in the up-down direction, the outer edge of the tooth distal end portion viewed in the up-down direction surrounds an outer edge of the tooth portion viewed in the up-down direction, the magnetic core has at least one structure of:

(A) one or more first protrusions protruding from the first lower surface, and (B) one or more second protrusions protruding from the second upper surface, the first lower surface includes a plurality of the first protrusions, and the plurality of the first protrusions are arranged in the front-rear direction or a left-right direction as viewed in the up-down direction.

2. The magnetic core according to claim 1, wherein the first lower surface has a first region overlapping the winding portion as viewed in the up-down direction, the one or more first protrusions include a first portion located in the first region, and a total area of a lower end of the first portion as viewed in the up-down direction is smaller than an area of the first region as viewed in the up-down direction.

3. The magnetic core according to claim 1, wherein the tooth portion has a left side including a left end of the tooth portion and extending in the front-rear direction and a right side including a right end of the tooth portion and extending in the front-rear direction as viewed in the up-down direction, and the one or more first protrusions are in contact with the left side or the right side as viewed in the up-down direction.

4. The magnetic core according to claim 1, wherein the one or more first protrusions include a portion located in a region above the winding portion.

5. A magnetic core comprising:

a back yoke portion having a first upper surface and a first lower surface aligned in an up-down direction;

a tooth distal end portion having a second upper surface and a second lower surface aligned in the up-down direction; and a tooth portion extending in the up-down direction and having an upper end in contact with the first lower surface and a lower end in contact with the second upper surface, the tooth portion constructed to have a winding portion of a conductor wound around the tooth portion as viewed in the up-down direction, wherein an outer edge of the back yoke portion viewed in the up-down direction surrounds an outer edge of the tooth distal end portion viewed in the up-down direction, the outer edge of the tooth distal end portion viewed in the up-down direction surrounds an outer edge of the tooth portion viewed in the up-down direction, the magnetic core has at least one structure of:

(A) one or more first protrusions protruding from the first lower surface, and (B) one or more second protrusions protruding from the second upper surface, the second upper surface has a second region overlapping the winding portion as viewed in the up-down direction, the one or more second protrusions include a second portion located in the second region, and a total area of an upper end of the second portion as viewed in the up-down direction is smaller than an area of the second region as viewed in the up-down direction.

6. A magnetic core comprising:

a back yoke portion having a first upper surface and a first lower surface aligned in an up-down direction;

a tooth distal end portion having a second upper surface and a second lower surface aligned in the up-down direction; and a tooth portion extending in the up-down direction and having an upper end in contact with the first lower surface and a lower end in contact with the second upper surface, the tooth portion constructed to have a winding portion of a conductor wound around the tooth portion as viewed in the up-down direction, wherein an outer edge of the back yoke portion viewed in the up-down direction surrounds an outer edge of the tooth distal end portion viewed in the up-down direction, the outer edge of the tooth distal end portion viewed in the up-down direction surrounds an outer edge of the tooth portion viewed in the up-down direction, the magnetic core has at least one structure of:

(A) one or more first protrusions protruding from the first lower surface, and (B) one or more second protrusions protruding from the second upper surface, the second upper surface includes a plurality of the second protrusions, and the plurality of the second protrusions are arranged in the front-rear direction or a left-right direction as viewed in the up-down direction.

7. The magnetic core according to claim 1, wherein the tooth portion has a left side including a left end of the tooth portion and extending in the front-rear direction and a right side including a right end of the tooth portion and extending in the front-rear direction as viewed in the up-down direction, and the one or more second protrusions are in contact with the left side or the right side as viewed in the up-down direction.

8. The magnetic core according to claim 1, wherein the one or more second protrusions include a portion located in a region below the winding portion.

9. A magnetic core comprising:

a back yoke portion having a first upper surface and a first lower surface aligned in an up-down direction;

a tooth distal end portion having a second upper surface and a second lower surface aligned in the up-down direction; and a tooth portion extending in the up-down direction and having an upper end in contact with the first lower surface and a lower end in contact with the second upper surface, the tooth portion constructed to have a winding portion of a conductor wound around the tooth portion as viewed in the up-down direction, wherein an outer edge of the back yoke portion viewed in the up-down direction surrounds an outer edge of the tooth distal end portion viewed in the up-down direction, the outer edge of the tooth distal end portion viewed in the up-down direction surrounds an outer edge of the tooth portion viewed in the up-down direction, the magnetic core has at least one structure of:

(A) one or more first protrusions protruding from the first lower surface, and (B) one or more second protrusions protruding from the second upper surface, the tooth portion includes a front side including a front end of the tooth portion and extending in a left-right direction and a rear side including a rear end of the tooth portion and extending in the left-right direction as viewed in the up-down direction, and the one or more first protrusions are in contact with the front side or the rear side as viewed in the up-down direction.

10. A magnetic core comprising:

a back yoke portion having a first upper surface and a first lower surface aligned in an up-down direction;

a tooth distal end portion having a second upper surface and a second lower surface aligned in the up-down direction; and a tooth portion extending in the up-down direction and having an upper end in contact with the first lower surface and a lower end in contact with the second upper surface, the tooth portion constructed to have a winding portion of a conductor wound around the tooth portion as viewed in the up-down direction, wherein an outer edge of the back yoke portion viewed in the up-down direction surrounds an outer edge of the tooth distal end portion viewed in the up-down direction, the outer edge of the tooth distal end portion viewed in the up-down direction surrounds an outer edge of the tooth portion viewed in the up-down direction, the magnetic core has at least one structure of:

(A) one or more first protrusions protruding from the first lower surface, and (B) one or more second protrusions protruding from the second upper surface, the tooth portion includes a front side including a front end of the tooth portion and extending in a left-right direction and a rear side including a rear end of the tooth portion and extending in the left-right direction as viewed in the up-down direction, and the one or more second protrusions are in contact with the front side or the rear side as viewed in the up-down direction.

11. The magnetic core according to claim 1, wherein a length of the first upper surface in a left-right direction is longer than a length of the first lower surface in the left-right direction.

12. The magnetic core according to claim 1, wherein a length of the second upper surface in a left-right direction is longer than a length of the second lower surface in the left-right direction.

13. The magnetic core according to claim 1, wherein the first lower surface includes a plurality of the first protrusions, the second upper surface includes a plurality of the second protrusions, the plurality of the first protrusions are arranged in the front-rear direction or a left-right direction as viewed in the up-down direction, and the plurality of the second protrusions are arranged in the front-rear direction or a left-right direction as viewed in the up-down direction.

14. The magnetic core according to claim 1, wherein the tooth portion has a left side including a left end of the tooth portion and extending in the front-rear direction and a right side including a right end of the tooth portion and extending in the front-rear direction as viewed in the up-down direction, the one or more first protrusions are in contact with the left side or the right side as viewed in the up-down direction, and the one or more second protrusions are in contact with the left side or the right side as viewed in the up-down direction.

15. A winding with a magnetic core comprising:

the magnetic core according to claim 1; and a conductor wound around the tooth portion.

16. The winding according to claim 15, wherein the first lower surface includes a plurality of the first protrusions, and the plurality of the first protrusions are arranged in the front-rear direction or a left-right direction as viewed in the up-down direction.

17. The winding according to claim 16, wherein the second upper surface includes a plurality of the second protrusions, and the plurality of the second protrusions are arranged in the front-rear direction or a left-right direction as viewed in the up-down direction.

18. A rotary electric machine comprising the magnetic core according to claim 1.

19. A brushless motor comprising the magnetic core according to claim 1.

* * * * *